Patented July 14, 1936

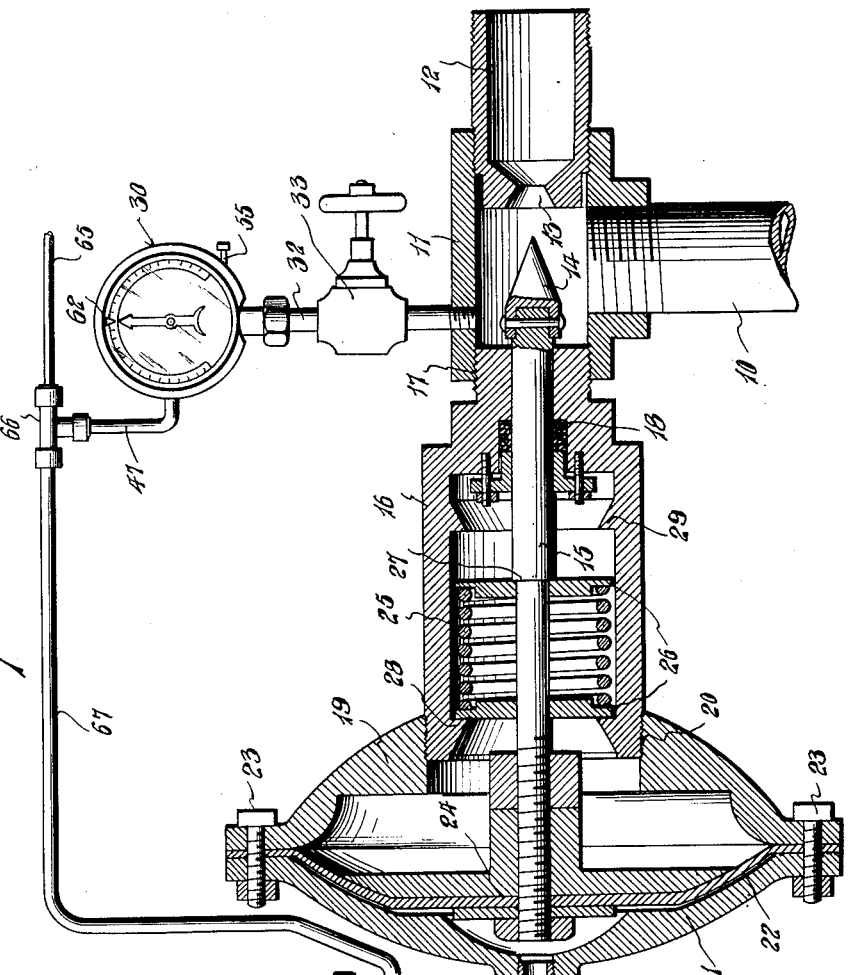

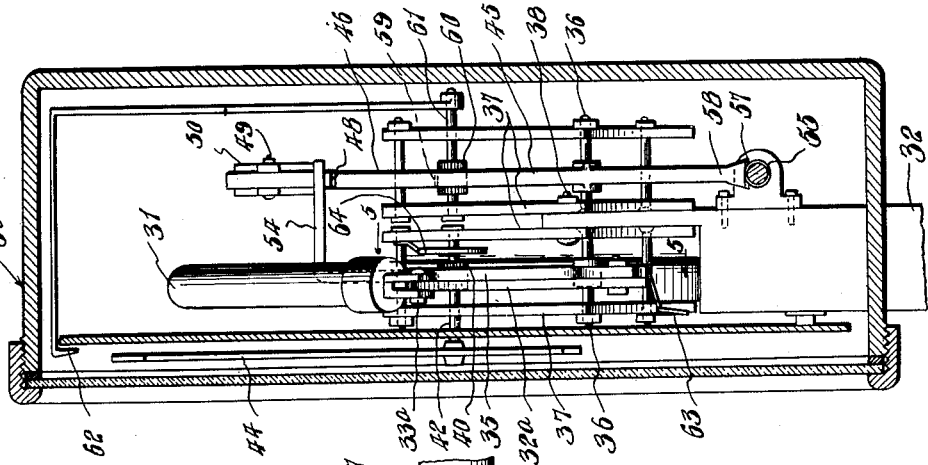
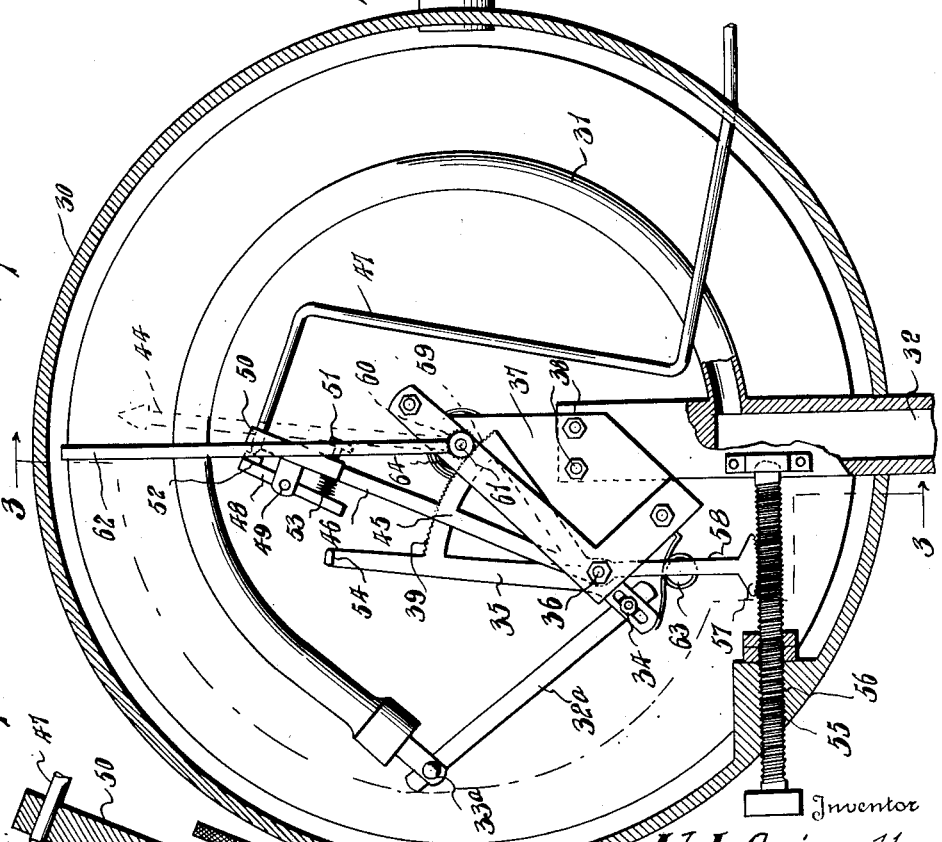
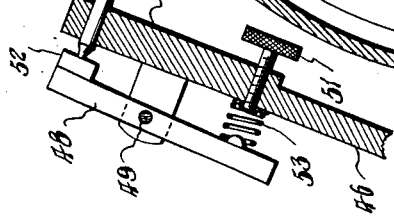

2,047,581

UNITED STATES PATENT OFFICE 2,047,581

PRESSURE RELIEF VALVE

William J. Grissett, Texon, Tex.

Application April 18, 1935, Serial No. 17,108

4 Claims. (Cl. 137—153)

This invention relates to a valve designed to automatically release excess pressure under various conditions, for instance in oil and gas separators, oil and gas wells, gas lines and the like, to act as back pressure valves on oil and gas wells and separators, without freezing as do the spring and lever type actuated valves.

It is also aimed to provide such a construction wherein in changing the control from the high pressure side to the low pressure side, the device will serve as a regulator valve for high pressure air and gas systems, where the pressure is to be stepped down or lowered.

It is also aimed to provide a novel outside power control initiated by the internal power so as to overcome the objections noted as well as the other objections well known to the present devices used in the art.

The more specific objects and advantages will become apparent from a consideration of the description following taken in connection with accompanying drawings illustrating an operative embodiment.

In said drawings:—

Figure 1 is a view showing the apparatus primarily in central longitudinal section;

Figure 2 is a vertical sectional view taken through the pressure gauge;

Figure 3 is a vertical sectional view taken on the line 3—3 of Figure 2;

Figure 4 is an enlarged detail partly in section through the leak valve of the pressure gauge; and Figure 5 is a detail fragmentary elevation of the parts controlling the leak valve operation.

Referring specifically to the drawings, wherein like reference characters designate like or similar parts, 10 designates a pipe in communication with an oil and gas separator, a gas or oil well, gas lines or the like wherein excessive or dangerous pressure may occur, and pipe 10 is connected with a coupling or valve chamber 11 from which a relief pipe 12 leads to the atmosphere, such pipe 12 having a valve seat 13 at its inner end forming a reducing nipple as shown. Said seat 13 is normally engaged by a valve head 14, thus cutting off escape of material from the pipe 10 through the pipe 11 to the atmosphere. Said valve head 14 is adapted to be displaced to uncover the port 13 upon the occurrence of excessive and dangerous pressures.

Said valve 14 is carried by a stem 15 slidably mounted in a conduit or casing 16 screwed at 17 into the casing 11, such part or barrel 16 having a stuffing box at 18 about said stem 15. A bulged plate 19 is screwed at 20 to the barrel 16 and coacting with the plate 19 is a bulged plate 21. A flexible diaphragm 22 is disposed and fastened air-tight between the plates 19 and 21 by means of bolts 23 or the equivalent. Said stem 15 is tightly connected to said diaphragm 22 at 24 in any suitable manner. Surrounding the stem 15 is a coil spring 25 which at opposite ends abuts disks 26 loosely disposed on the rod 15, and one of them abutting a shoulder 27 on such rod. Interiorly of the barrel 16 it is provided with abutments 28 and 29, respectively engageable by the disks 26.

A pressure gauge is shown at 30 which includes a Bourdon tube 31 in communication with a conduit 32 connected to the coupling 11 and thus communicating with the interior of the coupling 11. Preferably a cut-off valve 33 is connected in the conduit 32. Said Bourdon tube 31 has a link 32ª pivoted thereto at 33ª which is adjustably connected at 34 to a segment 35, pivoted at 36 to a mounting plate or bracket 37 fastened as at 38 to the upper end of the conduit 32. Segment 35 has gear teeth at 39 and they are enmeshed at 40 with the gear teeth 41 on a spindle 42 to which a hand 44 is rigid, so that the hand may be moved about the gauge to register pressure. An arm or segment 45 is also pivoted to the bracket 37 by the bolt 36 and it has an arm 46 in one end of which a flexible or slightly flexible conduit 47, for instance, of copper, is fastened, such end being open and normally closed by a valve lever 48 pivoted at 49 to a bracket 50, which has said pipe 47' fastened. Said valve lever 48 has a pad 52 which may be of rubber or the like and engages and normally closes the end of pipe 47 adjacent thereto under the expansive action or urgency of a coil spring 53.

The segment 35 has an arm 54 thereon which is adapted to contact the lever valve 48 and move it away from the adjacent end of the conduit 47', permitting the latter to bleed, and through means now to be specifically described, enable the valve 14 to slide to the left in Figure 1, uncover the port 13 and permit excess pressure to escape from the pipe 10, through the chamber 11, nipple 13 and pipe 12 to the atmosphere. The position of the valve 48 may be varied through the turning of a screw 55, threaded in the casing of the gauge at 56, the threads of the screw contacting with worm teeth 57 on an arm 58 depending from the segment 45, it being understood that the pipe 47' moves with the arm 46 and bracket 50 a slight extent necessary for operation. Teeth 59 are provided on the segment 45 and they are in mesh with a pinion 60 keyed to a shaft 61 to which an indicator arm 62 is fastened. Arm 62 is thus movable to accord with any variation in the position of the valve device 48 and it indicates at what pressure the arm 54 will contact and open the valve 48, thus governing the pressure at which the valve 14 may open. Suitable expansive springs 63 and 64 are associated with the lever or segment 35 and the shaft of the indicator arm 44.

Fluid pressure from any suitable source additional and extraneous to that which may be present in pipe 10, is supplied through a pipe or conduit 65, from which the aforesaid pipe 47 branches, at a coupling 66, and from the coupling 66, a pipe or conduit 67 leading to a suitable chamber 68 in which a diaphragm 69 is secured marginally tight and urged downwardly by an expansive spiral spring 70, adjustable as to tension through the manipulation of a screw 71. Depending from the chamber 68 is a pipe 72 having a coupling 73 fastened thereto and from which a short pipe 74, leads through the plate 21 so as to communicate with the space or chamber at the left hand side of the diaphragm 22.

Fluid under pressure from the same source as that which supplies the pipe 65, is supplied through a pipe 75 leading to the interior of the coupling 73 in which and in the pipe 72, a valve rod 77 is slidable, being suitably connected at 78 to the diaphragm 69, and accordingly operable by the diaphragm. When the valve is opened, a seat 79 on the rod 77 closes the pipe 75 and opens a seat 80 at the lower end of pipe 72, while an enlarged portion 81 of the rod 77 is raised above the entrance to an exhaust line 82.

Normally the valve 14 engages the seat 13, the pressure in the pipe 10 being insufficient to displace such valve 14. Valve 14 will normally be maintained in closed position as the seat 79 is opened due to pressure fluid from pipe 67 entering the chamber 68 and pressure fluid passing through pipe 75 and pipe 74 against the left hand side of diaphragm 22, moving the same to the right in Figure 1. Pressure fluid is also in the branch 47. Should excessive pressure be developed in the pipe 10, a portion will pass through the conduit 32 into the Bourdon tube 31, expanding the same, moving the link 32ª, swinging segment 35 and causing arm 54 to contact the valve lever 48, thus uncovering the adjacent end of the pipe 47', permitting the excess pressure to bleed therefrom, escaping by way of pipes 47 and 67. This reduction in pressure affects pipe 67 so that the spring 70 urges the diaphragm 69 downwardly as well as rod 77, closing the inlet 79, and uncovering outlet 80 permitting the pressure to the left of the diaphragm 22 to escape through the pipe 74, chamber 73, pipe 72 and exhaust pipe 82.

It will be realized that in both positions of the spring 25 it is partly compressed so that the tension will aid in opening the valve 14 and also in closing the valve 14 as the case may be.

Various changes may be resorted to provided they fall within the spirit and scope of the invention.

What is claimed is:—

1. A device of the class described, comprising a Bourdon tube, a bleeder pipe, an arm to which the bleeder pipe is connected, a valve on said arm normally closing said bleeder pipe, a lever, means operable by the expansion of said tube to operate said lever, an arm on the lever to abut and open said valve, means operable to position the last-mentioned arm, an indicator in geared connection with the last-mentioned arm, a worm thread on the last-mentioned arm, and a screw operably meshing with said thread.

2. A device of the class described, comprising a casing, a Bourdon tube therein, a bleeder pipe, an arm in said casing to which the bleeder pipe is connected, means operable to vary the position of the arm relatively to the casing, a valve on said arm normally closing said bleeder pipe, a lever, means operable by the expansion of said tube to operate said lever, and an arm on the lever to abut and open said valve.

3. A device of the class described, comprising a Bourdon tube, a bleeder pipe, a conduit from which the Bourdon tube extends, a bracket on said conduit, a lever pivotally mounted on said bracket having an arm to which the bleeder pipe is connected, means operable to adjust said lever, a valve on said arm normally closing said bleeder pipe, a lever pivoted to the bracket on the same axis as the first-mentioned lever, a link means operable by the expansion of said tube to operate the second-mentioned lever, an arm on the second-mentioned lever to abut and open said valve, and an indicator means operable through movement of the second-mentioned lever.

4. A device of the class described, comprising a Bourdon tube, a bleeder pipe, a conduit from which the Bourdon tube extends, a bracket on said conduit, an adjustable lever pivotally mounted on said bracket having an arm to which the bleeder pipe is connected, a valve on said arm normally closing said bleeder pipe, a lever pivoted to the bracket on the same axis as the first-mentioned lever, a link means operable by the expansion of said tube to operate the second-mentioned lever, an arm on the second-mentioned lever to abut and open said valve, an indicator means operable through movement of the second-mentioned lever, the means on the first-mentioned lever provided with a worm thread, and a screw operably meshing with said worm thread.

WILLIAM J. GRISSETT.